US009570013B2

(12) United States Patent
Nobori

(10) Patent No.: US 9,570,013 B2
(45) Date of Patent: Feb. 14, 2017

(54) DIMMING CONTROL DEVICE, IMAGE DISPLAY DEVICE, AND DIMMING CONTROL METHOD

(71) Applicant: SEIKO EPSON CORPORATION, Tokyo (JP)

(72) Inventor: Tatsuhiko Nobori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 268 days.

(21) Appl. No.: 14/029,049

(22) Filed: Sep. 17, 2013

(65) Prior Publication Data

US 2014/0078167 A1 Mar. 20, 2014

(30) Foreign Application Priority Data

Sep. 19, 2012 (JP) ................................ 2012-206082

(51) Int. Cl.
*G09G 3/34* (2006.01)
*G09G 5/00* (2006.01)
*H04N 5/243* (2006.01)

(52) U.S. Cl.
CPC .... *G09G 3/3406* (2013.01); *G09G 2320/0285* (2013.01); *G09G 2320/0646* (2013.01); *G09G 2360/16* (2013.01)

(58) Field of Classification Search
CPC ............... G09G 2320/0285; G09G 2320/0646; G09G 2360/16; G09G 3/3406
See application file for complete search history.

(56) References Cited

U.S. PATENT DOCUMENTS 6,025,850 A * 2/2000 Gupta ................... G06T 7/0083 345/442
2005/0240886 A1* 10/2005 Bonges ............... G06F 17/5081 716/115
2007/0018951 A1 1/2007 Nobori et al.
2007/0025683 A1 2/2007 Nobori
2007/0176916 A1* 8/2007 Choe .................... G09G 3/3406 345/207
2007/0285574 A1 12/2007 Nobori
2008/0036872 A1 2/2008 Nobori
2009/0059097 A1 3/2009 Miura
2012/0033275 A1* 2/2012 Jonsson ................. H04N 1/486 358/512
2012/0086922 A1 4/2012 Yamashita et al.

FOREIGN PATENT DOCUMENTS

JP A-2005-010354 1/2005
JP B2-4210863 1/2009

(Continued)

OTHER PUBLICATIONS

Machine translated Toyooka, JP2005-010354, publication date: Jan. 13, 2005.*

*Primary Examiner* — Sing-Wai Wu
(74) *Attorney, Agent, or Firm* — Oliff PLC

(57) ABSTRACT

A light control device adjusts light intensity. The light control device determines whether or not the image based on an image signal is a correction object based on an image feature quantity of the image signal, and set adjustment information for adjusting intensity of light based on the determined result. Then, the light control device adjusts the light intensity of the light for the image display based on the adjustment information.

8 Claims, 9 Drawing Sheets

(56) References Cited

FOREIGN PATENT DOCUMENTS

| | | | |
|---|---|---|---|
| JP | 2009-058786 | A | 3/2009 |
| JP | B2-4432933 | | 3/2010 |
| JP | A-2010-204520 | | 9/2010 |
| JP | A-2010-210722 | | 9/2010 |
| JP | A-2010-211091 | | 9/2010 |
| JP | B2-4687515 | | 5/2011 |
| JP | B2-4687526 | | 5/2011 |
| JP | A-2012-083501 | | 4/2012 |
| JP | B2-4956932 | | 6/2012 |
| JP | B2-4962722 | | 6/2012 |
| JP | A-2013-050523 | | 3/2013 |

* cited by examiner

APL →

WHITE PEAK VALUE ↓

| | 0 | m1 | m2 | m3 | m4 | m5 | m6 | m7 | 1023 |
|---|---|---|---|---|---|---|---|---|---|
| 0 | | | | | | | | | |
| n1 | | | | | | | | | |
| n2 | | | | | | | | | |
| n3 | | | | | | | | | |
| n4 | | | | | | | | | |
| n5 | | | | | | | | | |
| n6 | | | | | | | | | |
| n7 | | | | | | | | | |
| 1023 | | | | | | | | | |

FIG. 5

DIMMING CONTROL DEVICE, IMAGE DISPLAY DEVICE, AND DIMMING CONTROL METHOD

The entire disclosure of Japanese Patent Application No. 2012-206082, filed Sep. 19, 2012, is expressly incorporated by reference herein.

BACKGROUND

1. Technical Field

The present invention relates to a dimming control device, an image display device, and a dimming control method.

2. Related Art

As an example of a display device, there has been known a projection display device (a liquid crystal projector) for projecting an image emitted from an optical system using a liquid crystal light valve on a screen in an enlarged manner with a projection lens.

However, such a projection display device has a problem that it is difficult to obtain sufficient contrast due to light leakage or stray light caused in a variety of optical elements constituting the optical system. In order to resolve such a problem, it is sufficient to, for example, vary the intensity of the light to be input to a liquid crystal light valve in accordance with an image signal. However, a high-pressure mercury lamp predominates as the light source used for the projection display device in the present circumstances, and there is a situation in which it is extremely difficult to control the light output intensity of the high-pressure mercury lamp itself.

Further, since the luminance of the light source is fixed as described above, there also arise a problem that the screen is too bright in, for example, a rather dark appreciation environment and a problem that the brightness of the screen varies in the case of changing the size of the projection image due to zooming.

Therefore, as an illumination device for the projection display device, there has been proposed a configuration provided with a dimming element having a structure of combining a louver (a light blocking plate) for dimming with respect to the light source, and performing control so that the light-blocking amount with respect to the outgoing light from the light source is varied in accordance with the image signal using the dimming element. Thus, the change of the light intensity of the light emitted from the light source can be performed at high speed and with high flexibility using the dimming element separated from the light source (see, e.g., JP-A-2005-10354).

However, in the case of performing the dimming control by the dimming element provided with the light-blocking plate as described above, the larger the dimming amount is, the more easily the color shading in the display image occurs.

In the liquid crystal projector, a fly-eye lens is disposed along a surface perpendicular to the light axis of the light emitted from the light source. The light emitted from the light source is divided by the fly-eye lens into a plurality of lights, and thus, the illuminance distribution of the light entering the liquid crystal light valve is homogenized.

By increasing the dimming amount using the dimming element provided with the light blocking plate, the number of lens cells through which the light is transmitted in the fly-eye lens decreases, which causes the color shading in the image displayed on the screen.

SUMMARY

An advantage of some aspects of the invention is to make the color shading in the image displayed be suppressed in the case of performing image display while performing the light control.

A light control device according to an aspect of the invention includes an image determination section adapted to determine whether or not an image based on an image signal is a correction object based on at least one of image feature quantities of the image signal, an adjustment information setting section adapted to set adjustment information for adjusting intensity of light based on the determined result of the image determination section, and a light control section adapted to control the light intensity of the light for the image display.

The light control device according to the aspect of the invention may be configured such that the adjustment information setting section corrects a basic adjustment information, which is set in accordance with a case in which it is determined that the image based on the image signal is not the correction object, in a case in which it is determined that the image based on the image signal is the correction object.

According to this configuration, the intensity of the light is controlled to be varied in accordance with the determination that the image based on the image signal is the image in which the image quality deterioration due to decrease of the intensity of the light such as color shading becomes conspicuous. Thus, it becomes possible to suppress the image quality deterioration of the image displayed when performing the image display using the light control.

The light control device according to the aspect of the invention may be configured such that the image determination section determines that the image based on the image signal is the correction object in a case in which the image is a raster image with same luminance uniformly distributed in a screen.

According to this configuration, when displaying the raster image in which the image quality deterioration due to decrease of intensity of the light from the light source becomes conspicuous, the light control is performed based on the aperture ratio thus corrected. Thus, the image quality deterioration when displaying the raster image is suppressed.

The light control device according to the aspect of the invention may be configured such that the image determination section determines that the image based on the image signal is the raster image in a case in which a difference between a white peak value, which is a maximum value of luminance values of respective pixels in a frame, and is one of the image feature quantities, and an average value of luminance in the frame, which is one of the image feature quantities, is within a certain value.

According to this configuration, it is possible to determine that the image is the raster image in the case in which the white peak value in the image feature quantities and the average value of the luminance in the frame are roughly the same. Thus, it becomes possible to appropriately determine whether or not the image is the raster image.

The light control device according to the aspect of the invention may be configured such that the image determination section determines that the image based on the image signal is the raster image in a case in which data more than a certain proportion of all data exists in classes within a certain range including a class with a largest number of data in a luminance histogram, which is one of the image feature quantities.

According to this configuration, it is possible to determine that the image is the raster image in the case in which the luminance histogram as the image feature quantity has a feature that almost all data exists in one specific class. Thus, it becomes possible to appropriately determine whether or not the image is the raster image.

The light control device according to the aspect of the invention may be configured such that the image determination section determines that the image based on the image signal is the correction object in a case in which the image is a monochrome image.

According to this configuration, when displaying the monochrome image in which the image quality deterioration due to decrease of intensity of the light from the light source becomes conspicuous, the light control is performed based on the aperture ratio thus corrected. Thus, the image quality deterioration when displaying the monochrome image is suppressed.

The light control device according to the aspect of the invention may be configured such that the image determination section determines that the image based on the image signal is the monochrome image in a case in which data more than a certain proportion of all data exists in classes within a certain range including a class with chroma of zero in a chroma histogram, which is one of the image feature quantities.

According to this configuration, it is possible to determine that the image is the monochrome image in the case in which the chroma histogram as the image feature quantity has a feature that almost all data exists in the class with chroma of zero. Thus, it becomes possible to appropriately determine whether or not the image is the monochrome image.

An image display device according to another aspect of the invention includes the light control device described above, and an optical system, and adapted to display the image signal as a projection image using the light having the light intensity changed by the light control device.

According to this configuration, the aperture ratio of the opening section for changing the light intensity of the light from the light source in the dimming element is controlled to be varied in accordance with the determination that the image based on the image signal is the image in which the image quality deterioration due to decrease of the intensity of the light from the light source such as color shading becomes conspicuous. Thus, it becomes possible to suppress the image quality deterioration of the image displayed when performing the image display using the light control.

A light control method according to still another aspect of the invention includes: determining whether or not an image based on an image signal is a correction object based on at least one of image feature quantities of the image signal, setting adjustment information for adjusting intensity of light based on the determined result, and controlling the intensity of the light for the image display based on the adjustment information.

According to this configuration, intensity of the light is controlled to be varied in accordance with the determination that the image based on the image signal is the image in which the image quality deterioration due to decrease of the intensity of the light such as color shading becomes conspicuous. Thus, it becomes possible to suppress the image quality deterioration of the image displayed when performing the image display using the light control.

As described above, the light control device and the image display device according to the aspects of the invention perform the control so as to vary the aperture ratio of the opening section for changing the light intensity of the light from the light source in the dimming element in accordance with the determination that the image based on the image signal is the image in which the image quality deterioration due to decrease of the intensity of the light from the light source such as color shading becomes conspicuous. Thus, it becomes possible to suppress the image quality deterioration of the image displayed when performing the image display using the light control.

BRIEF DESCRIPTION OF THE DRAWINGS

The invention will be described with reference to the accompanying drawings, wherein like numbers reference like elements.

FIG. 5 is a diagram showing a structural example of an extension ratio table and an aperture ratio table according to the first embodiment.

DESCRIPTION OF EXEMPLARY EMBODIMENTS

First Embodiment

Image Display Device: Configuration Example of Optical System

Figure 1:
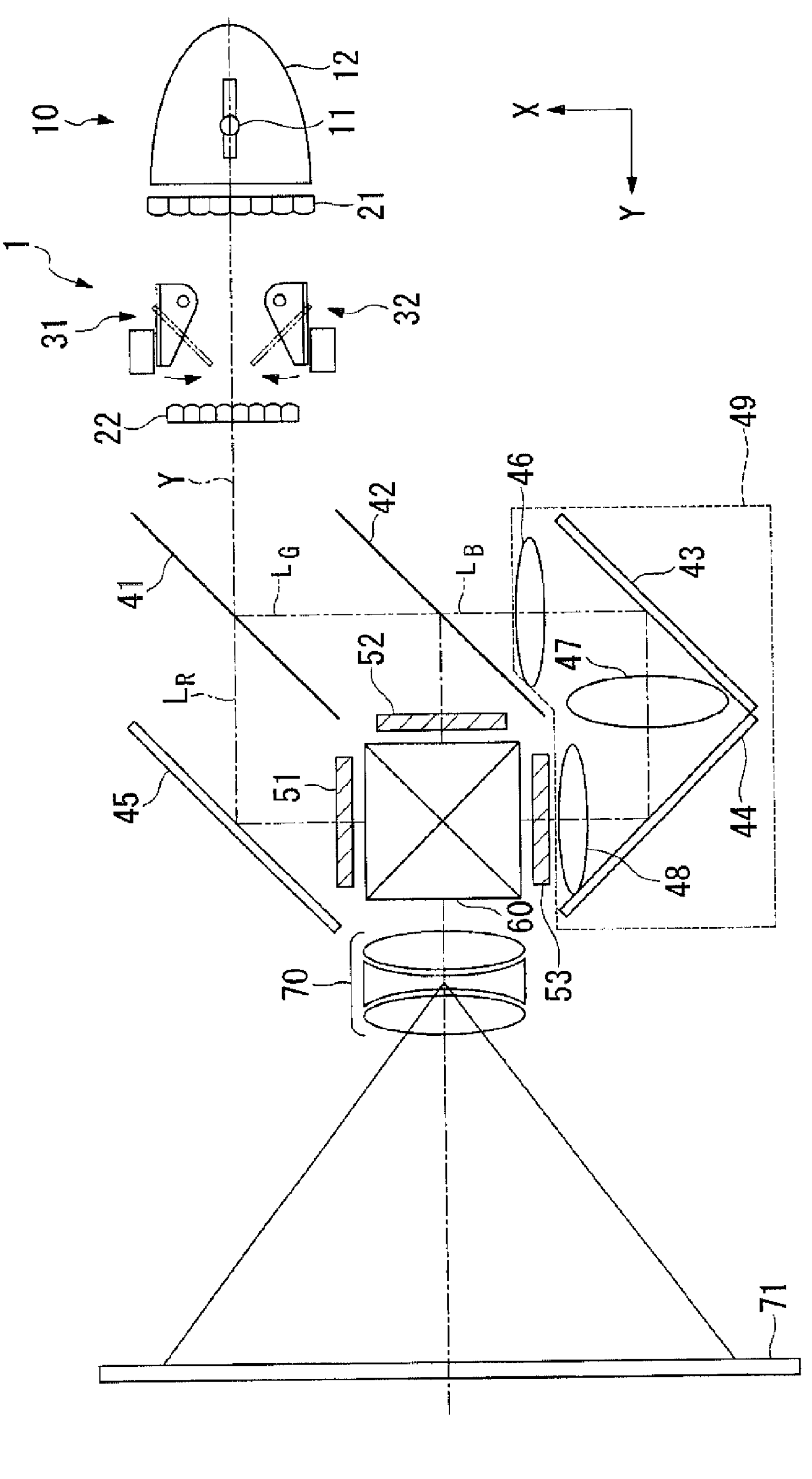
FIG. 1 is a diagram showing a configuration example of an optical system in an image display device according to an embodiment of the invention.

FIG. 1 shows a structural example of an optical system section in an image display device of a projection type according to an embodiment of the invention. The optical system section of the present embodiment displays an image signal, which is input to the image display device, as a projection image.

The image display device according to the present embodiment is a three-panel projection color liquid crystal display device provided with transmissive liquid crystal light valves for respective colors different from each other, namely R (red), G (green), and B (blue).

The optical system section shown in FIG. 1 is provided with an illumination device 1, dichroic mirrors 41, 42, reflecting mirrors 43, 44, and 45, liquid crystal light valves 51, 52, and 53, and a cross dichroic prism 60.

The illumination device 1 is provided with a light source 10, fly-eye lenses 21, 22, and light-blocking plates 31, 32. The light source 10 is provided with a lamp 11 such as a high-pressure mercury lamp, and a reflector 12 for reflecting the light of the lamp 11.

The first fly-eye lens 21 and the second fly-eye lens 22 are provided for homogenizing the illuminance distribution of the light source light on the liquid crystal light valves 51, 52, and 53 as an illuminated area. The first fly-eye lens 21 is disposed so that the light from the light source 10 is input to the first fly-eye lens 21, and the second fly-eye lens 22 is disposed so that the light having passed through the first fly-eye lens 21 is input to the second fly-eye lens 22.

The first fly-eye lens 21 divides the light emitted from the light source 10 into a plurality of lights L, and the second fly-eye lens 22 has a function as an overlapping lens for overlapping the lights L at the positions of the light valves. In some cases, it is also possible to dispose a condenser lens for overlapping a secondary light source image at a position of the second fly-eye lens 22 or the posterior stage of the second fly-eye lens 22. Hereinafter, the case of using the second fly-eye lens 22 as the overlapping lens will be explained.

In the case of the present embodiment, as dimming elements for controlling the light intensity of the light emitted from the light source 10, the light-blocking plates 31, 32 are rotatably installed between the first fly-eye lens 21 and the second fly-eye lens 22.

Then a configuration of a posterior stage of the illumination device 1 in FIG. 1 will be explained.

The dichroic mirror 41 for reflecting blue light and green light transmits red light LR in the light from the light source 10, and at the same time reflects the blue light LB and the green light LG. The red light LR transmitted through the dichroic mirror 41 is reflected by the reflecting mirror 45, and then enters the liquid crystal light valve 51 for the red light. On the other hand, out of the colored lights reflected by the dichroic mirror 41, the green light LG is reflected by the dichroic mirror 42 for reflecting the green light, and then enters the liquid crystal light valve 52 for the green light. On the other hand, the blue light LB is also transmitted through the dichroic mirror 42, and enters the liquid crystal light valve 53 for the blue light via a relay system 49 composed of the relay lens 46, the reflecting mirror 43, the relay lens 47, the reflecting mirror 44, and the relay lens 48.

The three colored lights modulated by the respective liquid crystal light valves 51, 52, and 53 enter the cross dichroic prism 60. The cross dichroic prism 60 is formed by bonding four rectangular prisms to each other, and is provided with a dielectric multilayer film for reflecting the red light and a dielectric multilayer film for reflecting the blue light formed on the inside surfaces forming a crisscross. The three colored lights are combined by these dielectric multilayer films to thereby form the light representing a color image. The light thus combined is projected on a screen 71 by a projection lens 70, which is the projection optical system, and thus an enlarged image is displayed.

Figure 2:
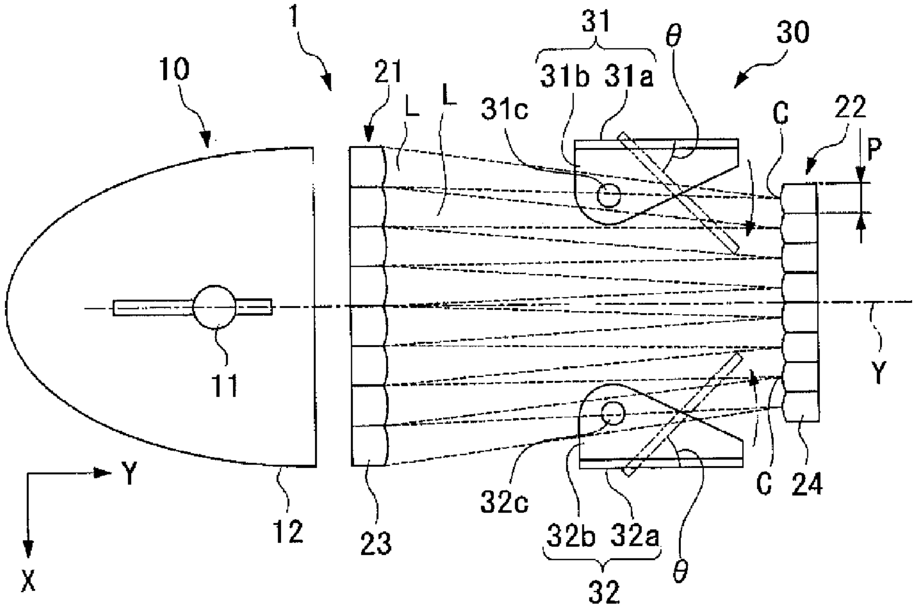
FIG. 2 is a side view showing a configuration example of an illumination device in the image display device according to the embodiment.
Figure 3:
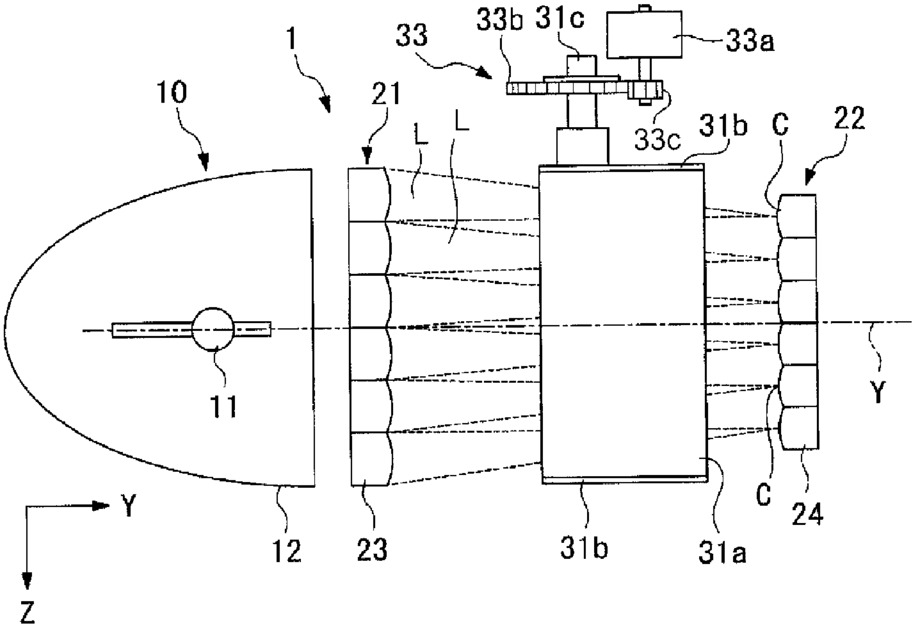
FIG. 3 is a front view showing the configuration example of the illumination device in the image display device according to the embodiment.

Then, a dimming function in the illumination device 1 according to the present embodiment will be explained with reference to FIGS. 2 and 3. Here, as an example of the illumination device 1, the illumination device having the light-blocking plates installed between the two fly-eye lenses will be described. FIGS. 2 and 3 are a side view and a plan view showing a schematic configuration of the illumination device according to the present embodiment, respectively. It should be noted that in FIGS. 2 and 3, the same parts as those shown in FIG. 1 are denoted with the same reference symbols, and the explanation thereof will be omitted.

A dimming element 30 is installed between the first fly-eye lens 21 and the second fly-eye lens 22. The dimming element 30 varies the light intensity by varying an aperture ratio of an opening section formed by the light-blocking plates 31, 32 for blocking the light emitted from the light source 10 for the image display. For this reason, the dimming element 30 is provided with a pair of light-blocking plates 31, 32 capable of blocking some or all of the lights L emitted from the light source 10 and then transmitted through the first fly-eye lens 21, and a rotating device 33 capable of rotating the light-blocking plates 31, 32.

The light-blocking plates 31, 32 are provided with plane sections 31*a*, 32*a* each having a rectangular shape, and arm sections 31*b*, 32*b* attached to both end portions of the plane sections 31*a*, 32*a*, respectively. The arm sections 31*b*, 32*b* are provided with rotary shafts 31*c*, 32*c* extending in parallel with main surfaces of the plane sections 31*a*, 32*a*, respectively, and the plane sections 31*a*, 32*a* are configured to be able to rotate around the rotary shafts 31*c*, 32*c*, respectively. These light-blocking plates 31, 32 are configured to have the shapes, the rotation radius, and so on equal to each other.

Further, the rotary shafts 31*c*, 32*c* are disposed on the first fly-eye lens 21 side, and it is arranged that end portions of the plane sections 31*a*, 32*a* on the second fly-eye lens 22 side are moved along the surface of the second fly-eye lens 22 in accordance with the rotation. It should be noted that as shown in FIG. 3, the arm sections 31*b*, 32*b* are disposed outside the light path of the outgoing light from the first fly-eye lens 21 so as not to block the light.

As shown in FIG. 3, the rotating device 33 for the rotary shafts 31*c*, 32*c* is provided with gear wheels 33*b*, 33*c* respectively attached to the rotary shafts 31*c*, 32*c*, and a stepping motor (a drive source) 33*a* for rotating one 33*c* of the gear wheels 33*b*, 33*c*. The gear wheels 33*b*, 33*c* are rotated while meshing with each other to thereby rotate the rotary shafts 31*c*, 32*c* in the directions reverse to each other with the rotation amounts equal to each other.

In the initial state in which the dimming is not performed, the light-blocking plates 31, 32 have the plane sections 31*a*, 32*a* disposed parallel to the light axis Y as shown in FIG. 2. Further, in the initial state, each of the plane sections 31*a*, 32*a* is disposed outside the light path of the light emitted from the first fly-eye lens 21, and are configured to roughly vanishes the light-blocking amount. In contrast, in the case of performing the dimming (the dimming state), the plane sections 31*a*, 32*a* are rotated around the rotary shafts 31*c*, 32*c*, disposed at positions distant from the plane sections 31*a*, 32*a*, respectively, with a rotation amount θ in a range of 0° through 90°. Further, it is arranged that the positional state of the light-blocking plates 31, 32 is changed by varying the rotation amount θ by the rotating device 33, and thus, the light intensity of the outgoing light from the light source 10 is controlled.

Image Display Device: Configuration Example of Dimming Control System

Then, a configuration example of the dimming control system (the light control device, or the dimming control device) in the image display device according to the present embodiment will be explained with reference to FIG. 4.

The image display device shown in the drawing is provided with an image feature quantity calculation section 101, an extension ratio setting section 102, an extension ratio table storage section 103, an extension processing section 104, an aperture ratio setting section 105, an aperture ratio table storage section 106, an image determination section 107, and a dimming control section (a light control section) 108.

Further, in this drawing, there are shown the liquid crystal light valves 51, 52, and 53 for performing the light modulation using the image signal on which a luminance extension process is performed, and the dimming element 30 driven by the dimming control section 108.

The image feature quantity calculation section 101 calculates image feature quantities from the image signal. The image feature quantity calculation section 101 calculates, for example, a white peak value, an average picture level (APL) a luminance histogram, and a chromes histogram as the image feature quantities. The image feature quantity calculation section 101 calculates these image feature quantities for, for example, each frame.

The white peak value as the image feature quantity is the maximum value out of the luminance values of the respective pixels in the frame. The image feature quantity calculation section 101 obtains the highest luminance value of the luminance values of the respective pixels forming the image signal of one frame as the white peak value.

Further, the APL as the image feature quantity is an average value of the luminance in the frame.

The image feature quantity calculation section 101 calculates the average value of the luminance values, which the pixels forming the image signal of one frame have, and takes the average value as the APL.

Further, the luminance histogram as the image feature quantity shows a frequency distribution of the luminance values in the frame. The frequency in the luminance histogram is expressed by, for example, the number of pixels. For example, assuming that the luminance is expressed in 10 bits, the luminance value is in a range of “0 through 1023.” In this case, the luminance histogram shows how many pixels exist in each of the luminance value classes of “0 through 1023.”

The image feature quantity calculation section 101 sorts the pixels forming the image signal of one frame into the luminance values, and then sets the number of pixels for each of the luminance values obtained by the sort as the value (the frequency) of the bin for each of the luminance value classes in the luminance histogram. Thus, the luminance histogram corresponding to one frame is obtained.

Further, the chroma histogram as the image feature quantity shows a frequency distribution of the chroma of each of the pixels in the frame. The frequency in the chroma histogram is also expressed by, for example, the number of pixels. In this case, the chroma histogram shows how many pixels exist in each of the chroma value classes. It should be noted that the chroma S of each of the pixels can be obtained by the following formula under, for example, the R, G, B color signal system. It should be noted that in the following formula, Max(R,G,B) represents the maximum value out of the pixel values of R, G, and B, and Min(R,G,B) represents the minimum value out of the pixel values of R, G, and B.

$$S=\{\mathrm{Max}(R,G,B)-\mathrm{Min}(R,G,B)\}/\mathrm{Max}(R,G,B) \quad (1)$$

Although Formula (1) above corresponds to the case of normalizing the chroma in a range of “0” through “1,” in the case in which the normalization is not performed, the chroma S can also be obtained by the following formula.

$$S=\mathrm{Max}(R,G,B)-\mathrm{Min}(R,G,B) \quad (2)$$

The image feature quantity calculation section 101 obtains the chroma value of each of the pixels constituting the image signal of one frame. On that basis, the pixels are sorted into the chroma values, and then, the number of the pixels (data) for each of the chroma values obtained by the sort is stored in the bin of corresponding one of the chroma value classes in the chroma histogram. Thus, the chroma histogram corresponding to one frame is obtained.

The extension ratio setting section 102 sets an extension ratio $G_r$ used by the extension processing section 104 based on the image feature quantities calculated by the image feature quantity calculation section 101. Further, when setting the extension ratio $G_r$, the extension ratio setting section 102 looks up the extension ratio table stored in the extension ratio table storage section 103.

FIG. 5 shows a structural example of the extension ratio table. It should be noted that the extension ratio table shown in this drawing is an example in the case of expressing each of the white peak value and the APL as the image feature quantities in 10 bits.

The extension ratio table shown in FIG. 5 has a structure as a two-dimensional table storing the values of the extension ratio corresponding to respective combinations between the white peak values and the APL values. In the example shown in the drawing, the values of 0, n1, n2, n3, n4, n5, n6, n7, and 1023 are set as the white peak values. Here, n1, n2, n3, n4, n5, n6, and n7 are constants determined in advance. Similarly, the values of 0, m1, m2, m3, m4, m5, m6, m7, and 1023 are set as the APL. The values of m1, m2, m3, m4, m5, m6, and m7 are also constants determined in advance. It should be noted that each of the pairs of n1 and m1, n2 and m2, n3 and m3, n4 and m4, n5 and m5, n6 and m6, and n7 and m7 are not required to have the same value.

The extension ratio setting section 102 gets the white peak value and the APL as the image feature quantities. The extension ratio setting section 102 obtains the value of the extension ratio, which is stored so as to correspond to the combination of the white peak value and the APL thus gotten, from the extension ratio table.

It should be noted that in some cases, the white peak value thus gotten does not correspond to either of the values of 0, n1, n2, n3, n4, n5, n6, n7, and 1023. Further, in some cases, the value of the APL thus gotten fails to correspond to either of the values of 0, m1, m2, m3, m4, m5, m6, m7, and 1023. In this case, it is possible for the extension ratio setting section 102 to obtain the extension ratio $G_r$ by, for example, performing an interpolation process using the values stored in the extension ratio table so as to correspond to the combinations of the constants respectively approximate to the white peak value and the APL input to the extension ratio setting section 102.

The extension ratio setting section 102 sets the value, which is obtained from the extension ratio table in such a manner as described above, as the extension ratio G.

The extension processing section 104 performs a luminance extension process for extending the range of the luminance of the image signal in accordance with the extension ratio $G_r$ set by the extension ratio setting section 102.

The image signal in the present embodiment has, for example, a format including the color signals corresponding respectively to the colors of R, G, and B. In this case, the extension processing section 104 extends the luminance range in accordance with the extension ratio $G_r$ for each of the color signals of R, G, and B. Specifically, it is assumed that the color signals corresponding respectively to the colors of R, G, and B input to the extension processing section 104 are $r_{in}$, $g_{in}$, and $b_{in}$, and the color signals corresponding respectively to the colors of R, G, and B output by the extension processing section 104 are r, g, and b. On that basis, the extension processing section 104 obtains the color signals r, g, and b using, for example, Formula (3), Formula (4), and Formula (5) below as the luminance extension process.

$$r=r_{in}\cdot G_t \tag{3}$$

$$g=g_{in}\cdot G_t \tag{4}$$

$$b=b_{in}\cdot G_t \tag{5}$$

The extension processing section 104 outputs the color signals r, g, and b obtained in such a manner as described above respectively to the liquid crystal light valves 51, 52, and 53.

The liquid crystal light valve 51 modulates the red light LR in accordance with the color signal r input to the liquid crystal light valve 51. The liquid crystal light valve 52 modulates the green light LG in accordance with the color signal g input to the liquid crystal light valve 52. The liquid crystal light valve 53 modulates the blue light LB in accordance with the color signal b input to the liquid crystal light valve 53. Thus, the image on which the dimming control due to the luminance extension process has been performed is displayed on the screen 71.

The aperture ratio setting section 105 sets the aperture ratio of the opening section of the dimming element 30 based on the image signal. The aperture ratio is adjustment information for adjusting intensity of light. Further, when setting the aperture ratio, in the case in which it is determined that the image based on the image signal is a dimming correction object, the aperture ratio setting section 105 sets the aperture ratio (a corrected aperture ratio Ac, corrected adjustment information) obtained by correcting a basic aperture ratio (a basic aperture ratio A, basic adjustment information) to be set corresponding to the case in which it is determined that the image based on the image signal is not the dimming correction object.

In the first embodiment, the aperture setting section 105 sets the aperture ratio (the basic aperture ratio A, the corrected aperture ratio Ac) based on the image feature quantities of the image signal calculated by the image feature quantity calculation section 101. It should be noted that the opening section of the dimming element 30 is formed by the light-blocking plates 31, 32 in the dimming element 30. The aperture ratio represents the degree of opening with respect to the opening section. The lower the aperture ratio becomes, the narrower the opening section formed by the light-blocking plates 31, 32 becomes, and the light-blocking amount with respect to the light emitted from the light source 10 increases, and the image displayed becomes darker.

As shown in the drawing, for example, the aperture ratio setting section 105 is provided with a basic aperture ratio setting section 105A and an aperture ratio correction section 105B.

The basic aperture ratio setting section 105A sets the basic aperture ratio A. The basic aperture ratio A is an aperture ratio, which is basic, on which the correction has not yet been performed, and which is to be used for the dimming control in the case in which it is determined by the image determination section 107 that the image based on the image signal is not the dimming control object.

In the first embodiment, when setting the basic aperture ratio A, the basic aperture ratio setting section 105A looks up the aperture ratio table stored in the aperture ratio table storage section 106. It is possible to adopt, for example, a structure substantially the same as shown in FIG. 5 as the structure of the aperture ratio table.

The basic aperture ratio setting section 105A gets the white peak value and the APL as the image feature quantities. The basic aperture ratio setting section 105A obtains the value of the aperture ratio, which is stored so as to correspond to the combination of the white peak value and the APL thus gotten, from the aperture ratio table. It should be noted that in the case in which the white peak value or the value of the APL input to the basic aperture ratio setting section 105A fails to correspond to the constants set in the aperture ratio table, it is possible to perform an interpolation process similarly to the case of the extension ratio to thereby obtain the aperture ratio. The basic aperture ratio setting section 105A sets the value, which is obtained from the aperture ratio table in such a manner as described above, as the basic aperture ratio A.

It should be noted that the aperture ratio correction section 105E will be described later.

The image determination section 107 determines whether or not the image based on the image signal is the dimming correction object based on the image feature quantities of the image signal.

Here, the image of the dimming correction object denotes the image having the content, in which the image quality deterioration due to the decrease in light intensity of the light from the light source 10 such as color shading is more conspicuous than in the natural image with colors in the case in which the image quality degradation occurs. In the present embodiment, as the image corresponding to the dimming correction object, there can be cited, for example, a raster image and a monochrome image. Further, the dimming correction here denotes the case of performing the dimming control so that the light intensity of such a raster image or a monochrome image is different from the light intensity set in the case in which the raster image or the monochrome image is not displayed in response to the display of such a raster image or a monochrome image.

The raster image is a monochromatic image having a uniform distribution. In such an image, since no color variation exists in the entire screen, in the case in which color shift occurs, the color shift becomes conspicuous. Further, regarding the luminance, the raster image has the uniform luminance throughout the entire screen. In this regard, the raster image is an image having the same luminance uniformly distributed in the screen.

Further, the monochrome image is an achromatic image expressed by luminance alone. Also in such an image, in the case in which color shift occurs, since it results that a color appears in the normally achromatic image, the color shift becomes conspicuous.

In the case in which the image determination section 107 determines that the image based on the image signal is either one of the raster image and the monochrome image, the image determination section 107 determines that the image is the dimming correction object.

In the first embodiment, the image determination section 107 performs the determination on the raster image in, for example, the following manner.

The image determination section 107 gets the white peak value and the APL as the image feature quantities. Then, the image determination section 107 compares the white peak value and the APL thus gotten with each other, and then determines whether or not the white peak value and the APL have the same value as each other.

The fact that the white peak value and the APL have the same value as each other means that the image has the luminance uniformly distributed in the entire area, in other words, the image is the raster image. Therefore, in the case in which the white peak value and the APL have the same value as each other, the image determination section 107 determines that the image is the raster image.

Here, even the raster image has a possibility of generating a certain amount of difference between the white peak value and the APL due to noise and so on. Further, the image visually looks like a raster image even though a certain degree of luminance variation exists in the screen, any color shading becomes conspicuous, and therefore, it is more preferable to arrange that the image determination section 107 determines that such an image is the raster image.

From such a viewpoint as described above, the image determination section 107 sets a certain margin value for allowing the white peak value and the APL to be assumed as the same value, and in the case in which the difference value between the white peak value and the value of the APL falls within the margin value, the image determination section 107 determines that the image is the raster image. In other words, in the case in which the difference between the white peak value and the APL is equal to or smaller than a certain value (the margin value), the image determination section 107 assumes that the white peak value and the APL has the same value as each other, and determines that the image is the raster image.

Further, the image determination section 107 performs the determination on the monochrome image in, for example, the following manner.

The image determination section 107 gets the chroma histogram as the image feature quantity, and then analyzes the chroma histogram. In the case in which there is obtained an analysis result that all of the data exists in the class in which the chroma value is equal to "0 (zero)," the image determination section determines that the image is the monochrome image.

Since the monochrome image is an image composed of the luminance component alone, the chroma value is equal to "0" in any pixel in the frame. Therefore, the chroma histogram of the monochrome image becomes the histogram where all of the data exists in the class in which the chroma value is equal to "0."

Here, in some cases of the monochrome image, one or more data exists in the class with a value other than "0" in the chroma histogram due to noise and so on. Taking such a case into consideration, the image determination section 107 performs the determination on the monochrome image in, for example, the following manner. That is, in the case in which the data more than a certain proportion of all of the data exists in the classes within a certain range including the class with the chroma value of zero in the chroma histogram, the image determination section 107 determines that the image is the monochrome image on the assumption that all of the data exists in the class with the chroma value of zero.

In the aperture ratio setting section 105, the aperture ratio correction section 105B corrects the basic aperture ratio A, which has been set by the basic aperture ratio setting section 105A, in accordance with the determination result by the image determination section 107, and then sets the aperture ratio thus corrected as the corrected aperture ratio Ac.

For example, in the case in which it is determined by the image determination section 107 that the image is not the dimming correction object, the aperture ratio correction section 105B sets the basic aperture ratio A, which has been set by the basic aperture ratio setting section 105A, as the corrected aperture ratio Ac without correction. In other words, in this case, the aperture ratio correction section 105B does not perform the correction on the basic aperture ratio A.

In contrast, in the case in which the image determination section 107 determines that the image is the dimming correction object, the aperture ratio correction section 105E corrects the basic aperture ratio A, and then sets the value, which is obtained by the present correction, as the corrected aperture ratio Ac.

When correcting the basic aperture ratio A, it is possible for the aperture ratio correction section 105B to, for example, multiplies the basic aperture ratio A by a correction coefficient k determined in advance, and then set the value obtained by the multiplication as the corrected aperture ratio Ac. It should be noted that in this case, the correction coefficient k is a value greater than 1. Thus, the corrected aperture ratio Ac is increased to a value greater than the basic aperture ratio A before the correction. As described above, since the corrected aperture ratio Ac is set to a value greater than the basic aperture ratio A by the correction, in the dimming control based on the corrected aperture ratio Ac, it results that the opening section formed by the light-blocking plates 31, 32 is enlarged to increase the light intensity, and thus, the color shading in the image is diminished.

It should be noted that the method performed by the aperture ratio correction section 105B for correcting the basic aperture ratio A to set the corrected aperture ratio Ac is not limited to the example described above.

For example, it is also possible for the aperture ratio correction section 105B to add a correction additional value k1 determined in advance to the basic aperture ratio A, and then set the value obtained by the addition as the corrected aperture ratio Ac.

Further, it is also possible for the aperture ratio correction section to set, for example, the lowest allowable value for the aperture ratio as the corrected aperture ratio Ac. The lowest allowable value can be set by adding a value as a certain margin to a limit value of the aperture ratio with which the color shading can visually be allowed in the image such as the raster image or the monochrome image.

The dimming control section 108 controls the dimming element 30 based on the aperture ratio (the corrected aperture ratio Ac) set by the aperture ratio setting section 105 to thereby vary the intensity of the light emitted from the light source 10 for the image display.

Specifically, the dimming control section 108 calculates the rotation amount θ with which the state of the corrected aperture ratio Ac can be obtained, and then drives the rotating device 33 so that the plane sections 31*a*, 32*a* of the light-blocking plates 31, 32 in the dimming element 30 go into a positional state corresponding to the rotation amount θ.

Here, in the case in which the image determination section 107 determines that the image is not the dimming correction object, light intensity control with the basic aperture ratio A set by the basic aperture ratio setting section 105A is performed. Since the image displayed on the screen on this occasion is, for example, a natural image with colors, any color shading is visually hard to notice, and is not a particular obstacle in appreciating the image.

In contrast, in the case in which the image determination section 107 determines that the image is the dimming correction object, the light intensity control with the corrected aperture ratio Ac is performed. In other words, in the state in which, for example, the raster image, the monochrome image, or the like is displayed, the light intensity control with the aperture ratio higher than the basic aperture ratio A is performed. Thus, since the number of lens cells through which the light is transmitted is increased in the fly-eye lens, the color shading is suppressed. As a result, even in the case in which the image such as the raster image or the monochrome image is displayed, the user can appreciate the image without regard to the color shading similarly to the case of the natural image.

Procedure Example

Figure 6:
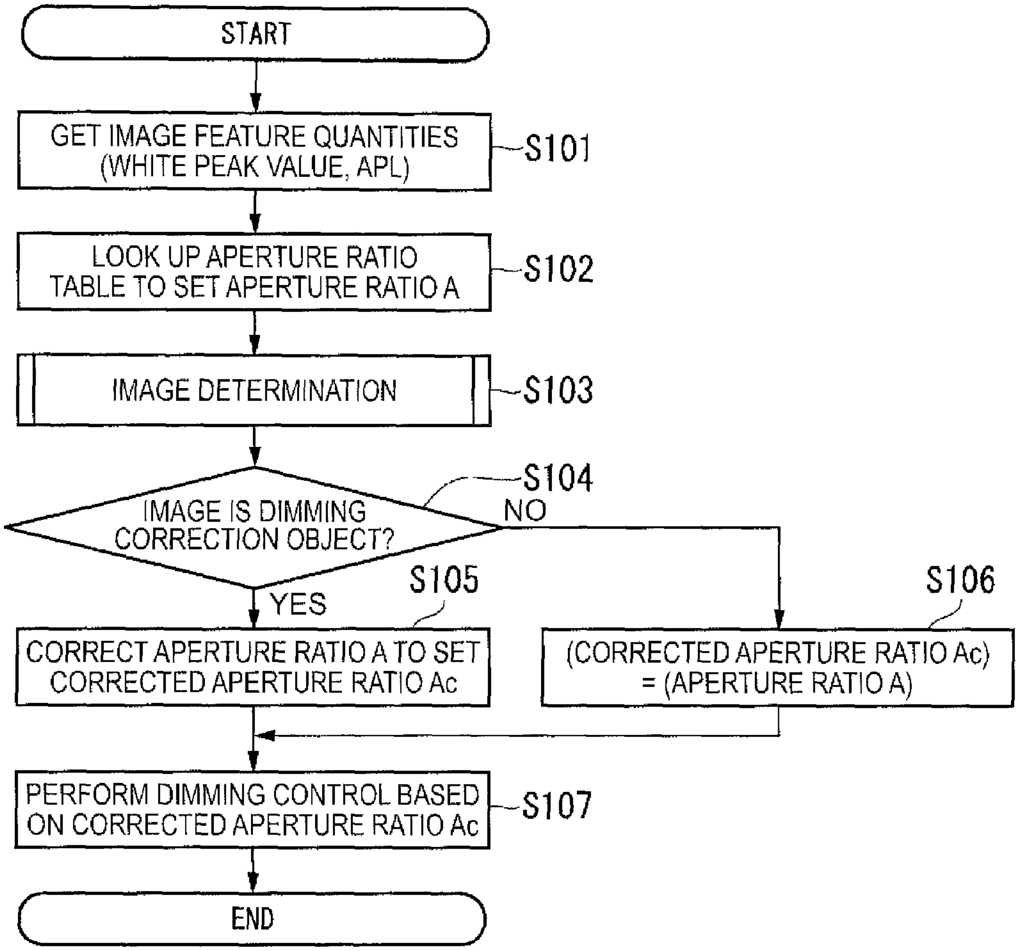
FIG. 6 is a diagram showing an example of a procedure performed for the dimming control using a dimming element by the image display device according to the first embodiment.

The flowchart of FIG. 6 shows an example of the procedure performed by the image display device according to the first embodiment for performing the dimming control using the dimming element 30. It should be noted that the process shown in this drawing is performed in sync with, for example, the timing of each of the frames of the image signal.

The image feature quantity calculation section 101 calculates the image feature quantities of the image signal frame by frame. The basic aperture ratio setting section 105A gets (step S101) the white peak value and the APL out of the image feature quantities calculated by the image feature quantity calculation section 101 in accordance with the present frame.

Then, the basic aperture ratio setting section 105A looks up (step S102) the aperture ratio table stored in the aperture ratio table storage section 106 to obtain the value of the aperture ratio corresponding to the combination of the white peak value and the APL thus gotten, and then set the value thus obtained as the basic aperture ratio A.

Further, the image determination section 107 determines (step S103) the content of the image based on the image signal of the present frame using the image feature quantities calculated in accordance with the present frame. Specifically, in step S103, the image determination section 107 determines whether or not the image based on the image signal of the present frame is one of the raster image and the monochrome image.

Then, the image determination section 107 determines (step S104) whether or not the image based on the image signal of the present frame is the dimming correction object in accordance with the determination result regarding the image obtained in the step S103.

In the case in which the determination result that the image is one of the raster image and the monochrome image is obtained in step S103, the image determination section 107 determines (YES in step S104) that the image based on the image signal of the present frame is the dimming correction object.

In this case, the aperture ratio correction section 105B performs (step S105) the correction (modification) on the basic aperture ratio A having been set in step S102 to set the value obtained by the correction as the corrected aperture ratio Ac.

On the other hand, in the case in which the determination result that the image is other than one of the raster image and the monochrome image is obtained in step S103, it results that the image based on the image signal of the present frame is, for example, a natural image with colors. In this case, the image determination section 107 determines (NO in step S104) that the image based on the image signal of the present frame is not the dimming correction object.

In this case, the aperture ratio correction section 105B sets (step S106) the corrected aperture ratio Ac in such a manner that the basic aperture ratio A set in step S102 is substituted for the corrected aperture ratio Ac. In other words, in this case, the aperture ratio correction section 105B does not perform the correction on the basic aperture ratio A.

The dimming control section 108 controls (step S107) the dimming element 30 to realize the positional state of the light-blocking plates 31, 32 corresponding to the corrected aperture ratio Ac set in one of steps S105 and S106.

Figure 7:
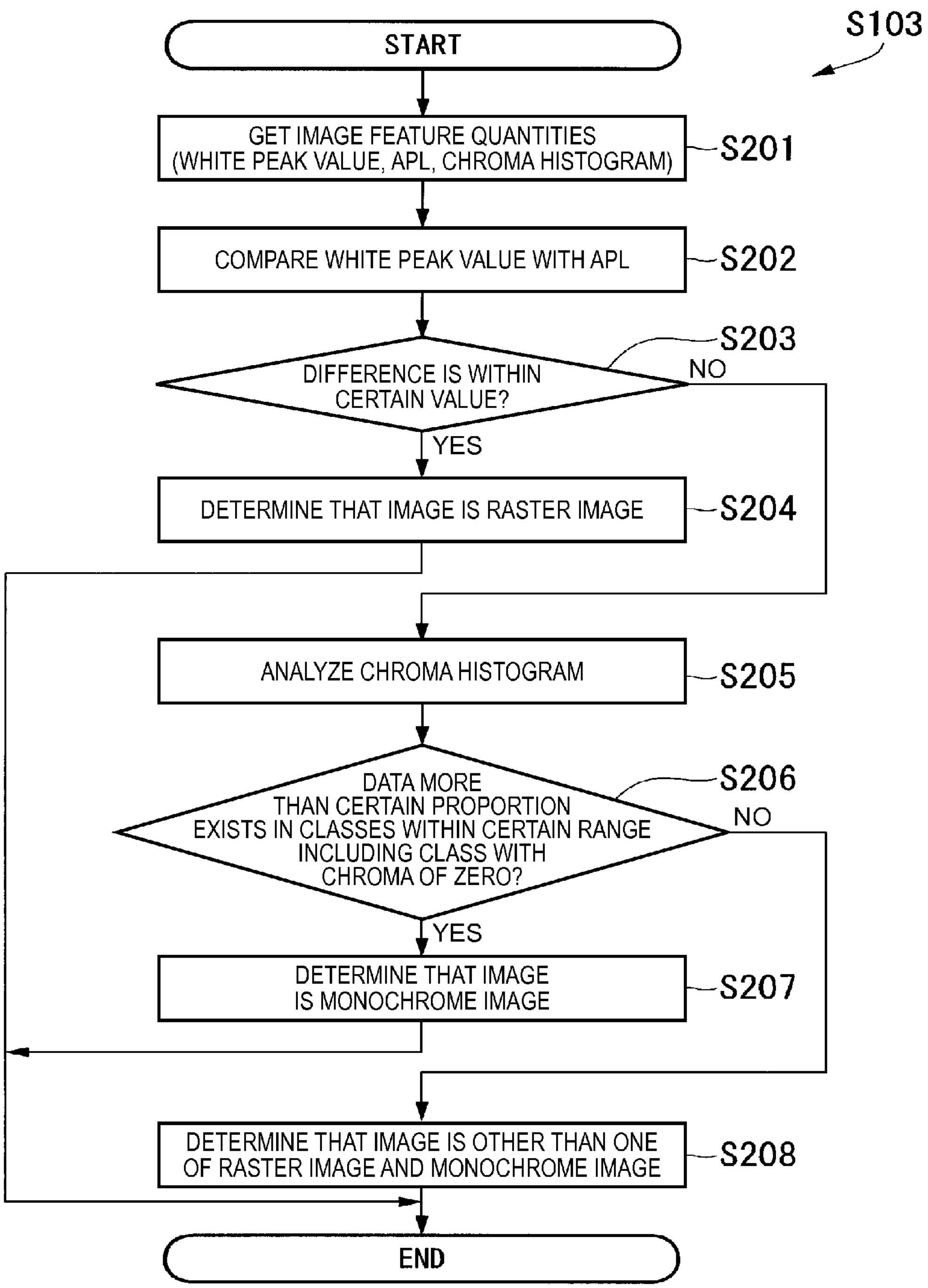
FIG. 7 is a diagram showing an example of a procedure for image determination by the image display device according to the first embodiment.

The flowchart of FIG. 7 shows an example of the procedure for the image determination performed by the image determination section 107 as step S103 shown in FIG. 6.

Steps S201 through S204 in FIG. 7 correspond to a process related to the determination of the raster image. The image determination section 107 gets (step S201) the white peak value, the APL, and the chroma histogram as the image feature quantities of the image signal of the present frame calculated by the image feature quantity calculation section 101.

Then, the image determination section 107 compares (step S202) the white peak value and the APL thus gotten with each other, and then determines (step S203) whether or not the difference between the white peak value and the APL is within a certain value.

If the difference between the white peak value and the APL is within the certain value (YES in step S203), the image determination section 107 determines (step S204) that the image based on the image signal of the present frame is the raster image.

Further, if the difference between the white peak value and the APL exceeds the certain value (NO in step S203), the image determination section 107 makes a translation to the process (steps S205 through S208) related to the determination of the monochrome image.

The image determination section 107 analyzes (step S205) the chroma histogram gotten as the image feature quantity. Then, the image determination section 107 determines (step S206) whether or not the data more than a certain proportion of all of the data exists in the classes in a certain range including the class with the chroma of zero in the chroma histogram based on the analysis result.

If the data more than the certain proportion of all of the data exists in the classes in the certain range including the class with the chroma of zero in the chroma histogram (YES in step S206), the image can be regarded as the image with the chroma of all of the pixels in the frame set to "0." Therefore, the image determination section 107 determines (step S207) that the image based on the image signal of the present frame is the monochrome image.

On the other hand, if the data more than the certain proportion of all of the data fails to exist in the classes in the certain range including the class with the chroma of zero in the chroma histogram (NO in step S206), the data exists in the classes outside the certain range in a discrete manner, and therefore, it results that the image is not the monochrome image. In this case, the image determination section 107 determines (step S208) that the image based on the image signal of the present frame is an image (e.g., a natural image with colors) other than one of the raster image and the monochrome image.

In the case in which the image determination section 107 determines that the image is the raster image in step S204 in FIG. 7, or the case in which the image determination section 107 determines that the image is the monochrome image in step S208, the image determination section 107 determines (YES in step S104) that the image is the dimming correction object in step S104 in FIG. 6.

On the other hand, in the case in which the image determination section 107 determines that the image is other than one of the raster image and the monochrome image in step S208 in FIG. 7, the image determination section 107 determines (NO in step S104) that the image is not the dimming correction object in step S104 in FIG. 6.

Figure 4:
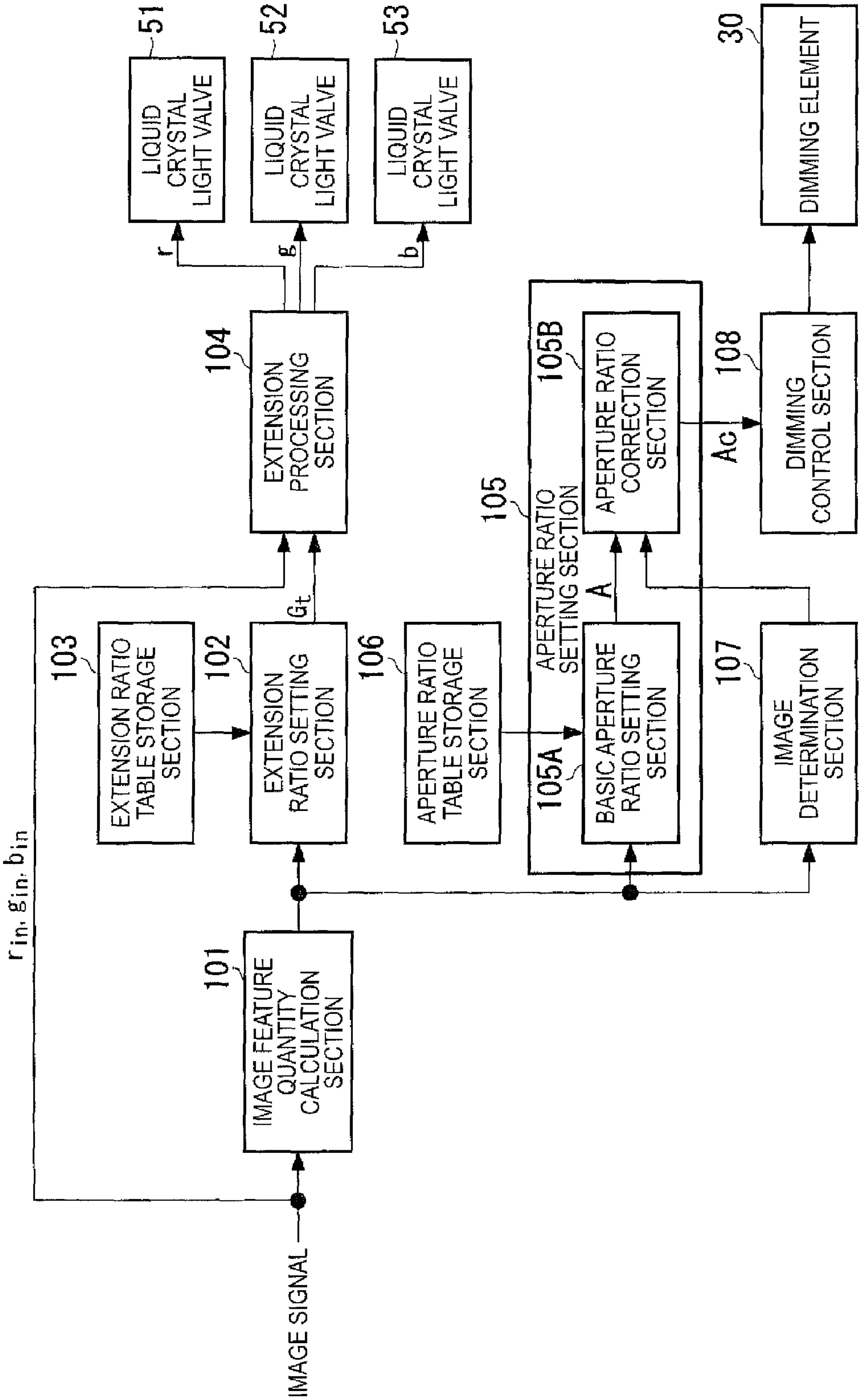
FIG. 4 is a diagram showing a configuration example of a dimming control system in an image display device according to a first embodiment of the invention.

It should be noted that in the aperture ratio setting section 105 having the configuration shown in FIG. 4, it is arranged to perform such a step-by-step process that the basic aperture ratio A is first set by the basic aperture ratio setting section 105A, and then the basic aperture ratio A is corrected in accordance with the determination result of the image determination section 107.

However, it is also possible for the aperture ratio setting section 105 to set the aperture ratio to be provided to the dimming control section 108 in, for example, the following manner.

That is, regarding the aperture ratio table, there is formed a table with three or more dimensions having combinations between parameters formed of the image feature quantities such as the white peak value and the APL, and a parameter corresponding to the determination result on whether or not the image is the dimming correction object by the image determination section 107, and the values of the aperture ratio, wherein the combinations and the values of the aperture ratio correspond to each other.

On that basis, the aperture setting section 105 obtains the value of the aperture ratio, which is stored in accordance with the combination of the image feature quantities calculated by the image feature quantity calculation section 101 and the determination result by the image determination section 107, from the aperture ratio table. Then, the aperture ratio setting section 105 sets the value obtained from the aperture ratio table in such a manner as described above as the aperture ratio (corresponding to the corrected aperture ratio Ac shown in FIG. 4) to be provided to the dimming control section 108. In the case of setting the aperture ratio in such a manner, the aperture ratio setting section 105 is not required to have a configuration separately provided with the basic aperture ratio setting section 105A and the aperture ratio correction section 105B.

Second Embodiment

General Outline

Subsequently, a second embodiment will be explained.

It should be noted that the configuration of the dimming control system in the image display device according to the second embodiment can substantially be the same as shown in FIG. 4.

The second embodiment is different from the first embodiment in the process of the image determination section 107 for determining whether or not the image is the raster image. In the second embodiment, when determining whether or not the image is the raster image, the image determination section 107 uses the luminance histogram in the image feature quantities.

In other words, the image determination section 107 in the second embodiment gets the luminance histogram as the image feature quantity calculated by the image feature quantity calculation section 101. The image determination section 107 analyzes the luminance histogram thus gotten, and in the case in which all of the data exists in one specific class in the luminance histogram according to the analysis result, the image determination section 107 determines that the image is the raster image.

The fact that all of the data exists in the one specific class in the luminance histogram means that all of the pixels in the frame have the same luminance value corresponding to the specific class. Therefore, the luminance histogram reflects the feature as the raster image having uniform luminance in the screen.

It should be noted that also in this case, it is preferable to provide a certain margin to the criterion for the determination taking the case in which the image having noise in the image signal or a certain degree of variation in the luminance of the screen is determined as the raster image into consideration. That is, in the case in which the data more than a certain proportion of all of the data exists in the classes within a certain range including the class with the largest number of data in the luminance histogram, the image determination section 107 determines that the image is the raster image on the assumption that all of the data exists in the one specific class.

Procedure Example

In the second embodiment, the procedure performed by the image display device for the dimming control using the dimming element 30 can substantially be the same as shown in, for example, FIG. 6. It should be noted that the procedure for determining the raster image in the image determination as step S103 shown in FIG. 6 is different from that of the first embodiment.

Figure 8:
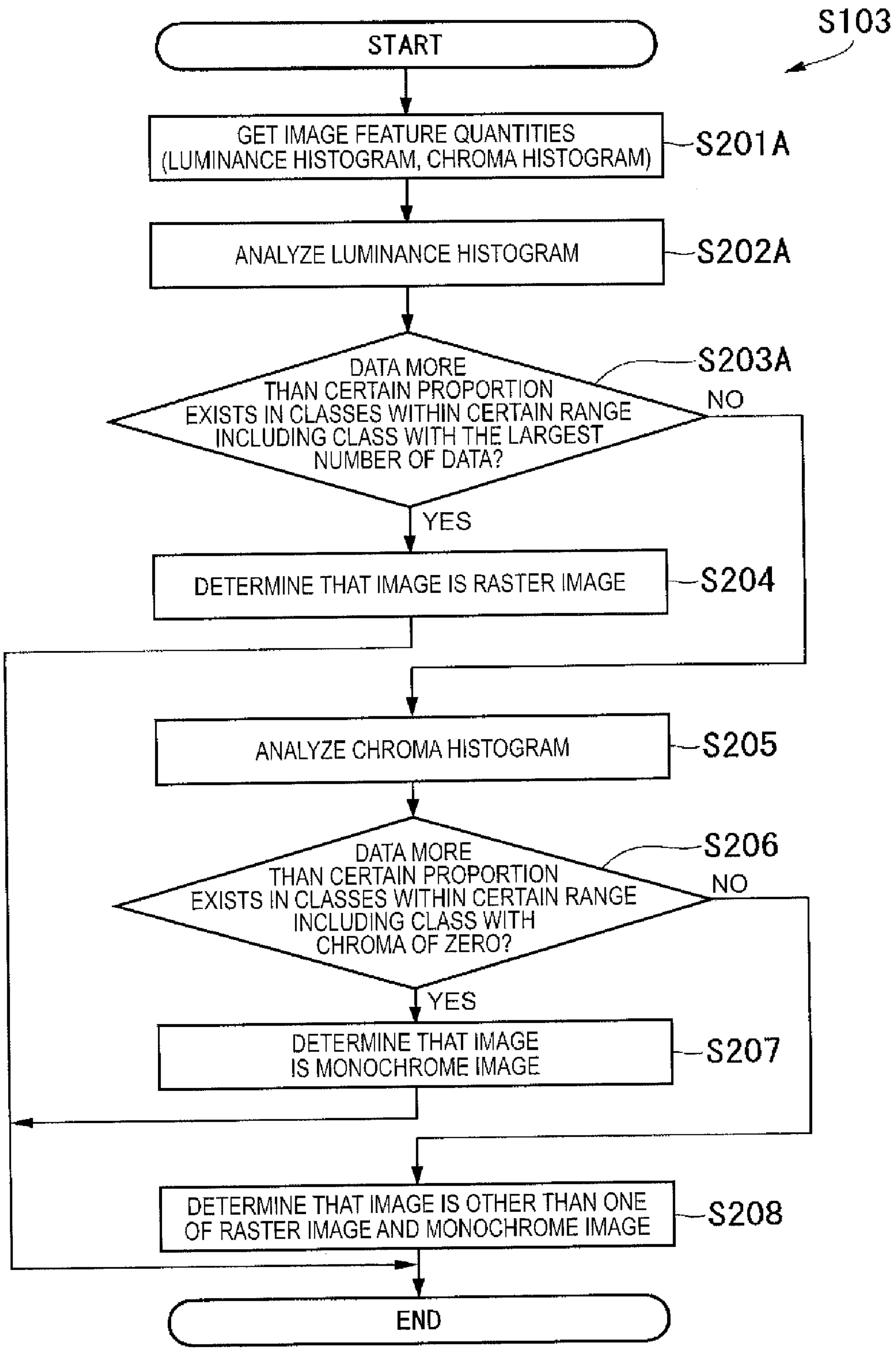
FIG. 8 is a diagram showing an example of a procedure for image determination by an image display device according to a second embodiment of the invention.

FIG. 8 shows an example of the procedure performed in the second embodiment as the image determination of step S103 shown in FIG. 6. It should be noted that in this drawing, the steps corresponding to the process substantially the same as the process shown in FIG. 7 are denoted with the same reference symbols, and the explanation thereof will be omitted.

The image determination section 107 gets (step S201A) the luminance histogram and the chroma histogram as the image feature quantities of the image signal of the present frame calculated by the image feature quantity calculation section 101.

Then, the image determination section 107 analyzes (step S202A) the luminance histogram, and then determines (step S203A) whether or not the data more than a certain proportion of all of the data exists in the classes in a certain range including the class with the largest number of data in the luminance histogram based on the analysis result.

If it is determined that the data more than the certain proportion of all of the data exists in the classes in the certain range including the class with the largest number of data (YES in step S203A), the image determination section 107 determines (step S204) that the image based on the image signal of the present frame is the raster image.

On the other hand, if the data more than the certain proportion of all of the data fails to exist in the classes in the certain range including the class with the largest number of data (NO in step S203A), the data exists in the classes outside the certain range in a discrete manner, and therefore, the image of the present frame is not the raster image. Therefore, in this case, the image determination section 107 makes a translation to the process on and after step S205. It should be noted that the process corresponding to steps S205 through S208 is substantially the same as shown in FIG. 7.

Third Embodiment

Image Display Device: Configuration Example of Dimming Control System

Then, a third embodiment will be explained.

Figure 9:
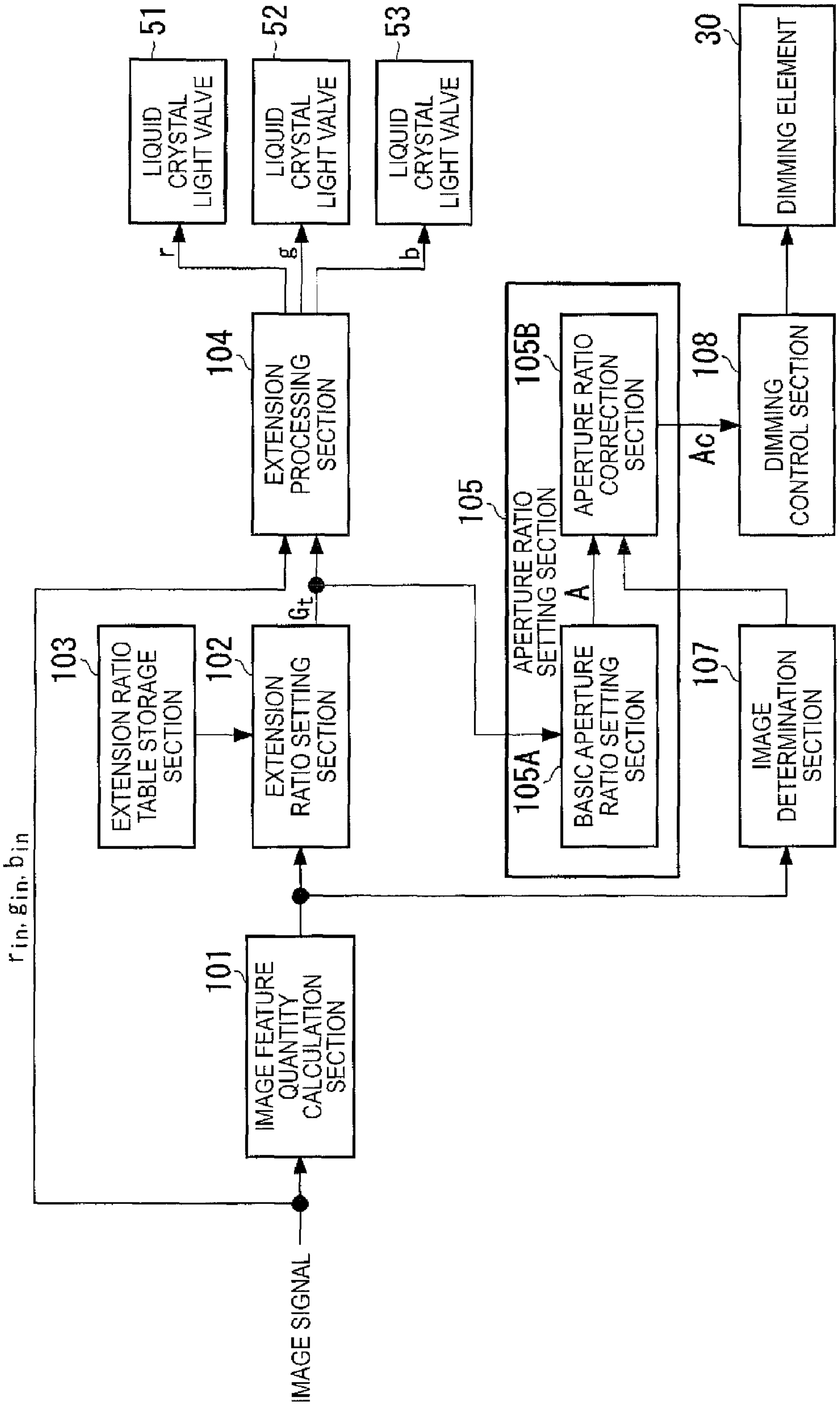
FIG. 9 is a diagram showing a configuration example of a dimming control system in an image display device according to a third embodiment of the invention.

FIG. 9 is a diagram showing a configuration example of a dimming control system in an image display device according to the third embodiment. It should be noted that in this drawing, the same parts as those in FIG. 4 are denoted with the same reference symbols and the explanation thereof will be omitted.

The basic aperture ratio setting section 105A shown in FIG. 9 gets the extension ratio $G_t$ set by the extension ratio setting section 102. The basic aperture ratio setting section 105A sets the basic aperture ratio A based on the extension ratio $G_t$. Since the basic aperture ratio setting section 105A sets the basic aperture ratio A based on the extension ratio $G_t$ as described above, the aperture ratio table storage section 106, which is shown in FIG. 4, is eliminated in FIG. 9.

Due to the luminance extension process, for example, the luminance range is enlarged in accordance with the decrease in luminance of the image to thereby expand the dynamic range. Therefore, the extension ratio $G_t$ for the luminance extension process is set to be increased in accordance with the decrease of the luminance. Further, due to the dimming control on the dimming element 30, by blocking the outgoing light from the light source 10 to thereby reduce the light intensity, it is possible to suppress the light leakage and the stray light to thereby reduce so-called black floating (lightening of black). According to the above, by reducing the light intensity in accordance with, for example, the decrease in luminance of the image, the so-called black floating (lightening of black) can effectively be suppressed. On this occasion, it is preferable to set the basic aperture ratio A so as to decrease in accordance with, for example, the rise of the extension ratio $G_t$.

By performing the calculation with the following formula using the extension ratio $G_t$, for example, the basic aperture ratio setting section 105A in the third embodiment can set the basic aperture ratio A so as to decrease in accordance with the rise of the extension ratio G. It should be noted that the symbol γ denotes a gamma value, and takes a value of, for example, 2.2.

$$A=G_t^{-\gamma} \quad (6)$$

It should be noted that the method for obtaining the basic aperture ratio A so as to decrease in accordance with the rise of the extension ratio $G_t$ is not limited to the calculation with Formula (6).

Procedure Example

Figure 10:
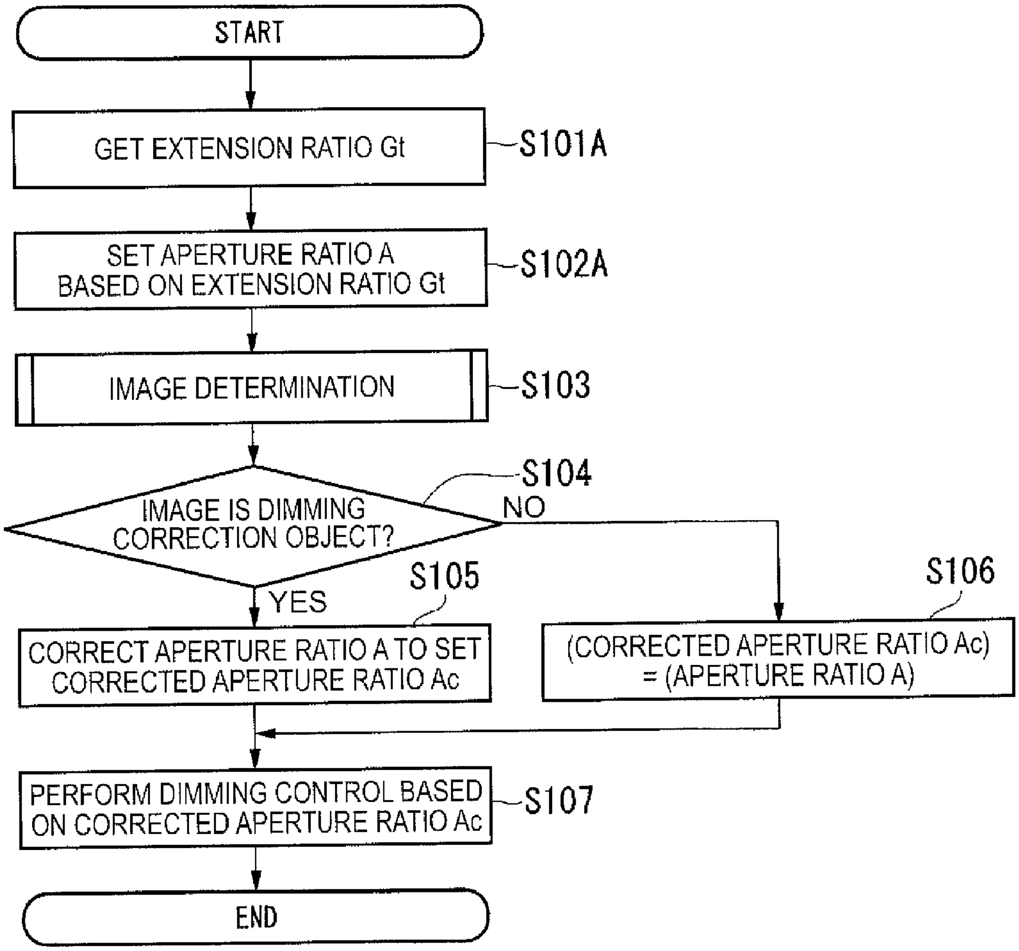
FIG. 10 is a diagram showing an example of a procedure performed for the dimming control using a dimming element by the image display device according to the third embodiment.

The flowchart of FIG. 10 shows an example of the procedure performed by the image display device according to the third embodiment for performing the dimming control using the dimming element 30. It should be noted that in FIG. 10, the steps corresponding to the process substantially the same as the process shown in FIG. 6 are denoted with the same reference symbols, and the explanation thereof will be omitted.

The basic aperture ratio setting section 105A in the third embodiment gets (step S101A) the extension ratio $G_t$ set by the extension ratio setting section 102.

Then, the basic aperture ratio setting section 105A sets (step S102A) the basic aperture ratio A based on the extension ratio $G_t$ thus gotten. For example, the basic aperture ratio setting section 105A sets the value, which is obtained by the calculation with Formula (6), as the basic aperture ratio A.

It should be noted that the processes corresponding respectively to steps S103 through S107 are substantially the same as shown in FIG. 6.

Further, when the image determination section 107 in the third embodiment determines the raster image, it is possible to compare the white peak value and the APL with each other as in the first embodiment, or to determine the raster image based on the result of the analysis of the luminance histogram as in the second embodiment.

Further, it is also possible for the aperture ratio setting section 105 having the configuration shown in FIG. 9 to set the aperture ratio to be provided to the dimming control section 108 in the following manner.

That is, the aperture ratio setting section 105 obtains the aperture ratio (corresponding to the corrected aperture ratio Ac shown in FIG. 4) by performing the calculation with, for example, a predetermined formula including the extension ratio Gt and a parameter corresponding to the determination result on whether or not the image is the dimming correction object obtained by the image determination section 107 instead of Formula (6). Also in the case of setting the aperture ratio in such a manner, the aperture ratio setting section 105 is not required to have a configuration separately provided with the basic aperture ratio setting section 105A and the aperture ratio correction section 105B.

MODIFIED EXAMPLES

First Modified Example

Then, a modified example of the present embodiment will be explained.

Firstly, as the first modified example, when the image determination section 107 determines the raster image, it is also possible to combine the process of comparing the white peak value and the APL as the image feature quantities with each other and the process of analyzing the luminance histogram as the image feature quantity with each other.

As an example, it is possible for the image determination section 107 to finally determine that the image is the raster image only when determining that the image is the raster image by comparing the white peak value and the APL with each other, and at the same time determining that the image is the raster image based on the result of the analysis of the luminance histogram.

Second Modified Example

Further, as the image corresponding to the dimming correction object, a gradation image can be included besides the raster image and the monochrome image. The gradation image is an image in which gradation with, for example, the luminance or the color gradually varying is expressed. In the gradation image, in particular in the case in which the monochrome gradation or the gradation between similar colors is expressed, the image quality deterioration due to the reduction of the intensity of the light from the light source such as color shading is apt to be conspicuous.

In the gradation image, the luminance, the hue, and so on each show a smooth variation along a certain direction in the screen. Therefore, the image determination section 107, for example, gets the luminance in each of the pixel positions, information of the hue in each of the pixel positions, and so on as the image feature quantities calculated by the image feature quantity calculation section 101, and then analyzes the variation in the luminance, the hue, and so on in accordance with the directions on the screen. Then, in the case in which the image determination section 107 determines that the luminance, the hue, and so on each show a gentle variation along a specific direction in the screen as a result of the analysis, it is possible for the image determination section 107 to determine that the image is the gradation image. It should be noted that in order to determine whether or not the gentle variation is shown, it is possible to determine whether or not the variation amount or the variation ratio of the luminance or the hue in each of predetermined screen directions is equal to or lower than a threshold value determined in advance.

Alternatively, as an easier way, it is possible to determine that the image is the gradation image in the case in which the hue histogram shows that the number of colors is smaller than a certain level, and at the same time, the frequency is uniformly distributed in the classes in the entire or a partial region of the luminance histogram.

The hue can be obtained based on color-difference signals of, for example, the color differences Cr, Cb. Alternatively, in the case of the R, G, and B signals, the hue can be obtained based on the magnitude relationship between the R, G, and B signals. In the case in which the hue is based on the R, G, and B signals, the hue H can be obtained using the following formula. It should be noted that the following formula corresponds to an example of the case in which the hue H takes a value in a range of “0” through “359.”

Specifically, in the case in which the maximum value of the R, G, and B pixel values is R, the hue H can be obtained using the following formula.

$$H=60*(G-B)/\{\mathrm{Max}(R,G,B)-\mathrm{Min}(R,G,B)\} \quad (7)$$

Further, in the case in which the maximum value of the R, G, and B pixel values is G, the hue H can be obtained using the following formula.

$$H=60*(B-R)/\{\mathrm{Max}(R,G,B)-\mathrm{Min}(R,G,B)\}+120 \quad (8)$$

Further, in the case in which the maximum value of the R, G, and B pixel values is B, the hue H can be obtained using the following formula.

$$H=60*(R-G)/\{\mathrm{Max}(R,G,B)-\mathrm{Min}(R,G,B)\}+240 \quad (9)$$

Further, the dimming element 30 having a structure provided with the light blocking plates can adopt, for example, a structure other than the structure shown in FIGS. 2 and 3.

Further, it is also possible to perform the dimming control by recording the program for realizing the functional sections in FIG. 4 or FIG. 9 on a computer-readable recording medium, and then making the computer system retrieve and then execute the program recorded on the recording medium. It should be noted that the “computer system” mentioned here should include an OS and the hardware such as peripheral devices.

Further, in the case of using the WWW system, the “computer system” should also include a home page providing environment (or display environment).

Further, the “computer-readable recording medium” denotes a portable recording medium such as a flexible disk, a magneto-optical disk, a ROM, and a CD-ROM, and a storage device such as a hard disk incorporated in the computer system. Further, the “computer-readable recording medium” should include those holding a program for a certain period of time such as a volatile memory (a RAM) in a computer system to be a server or a client in the case of transmitting the program via a network such as the Internet, or a communication line such as a telephone line. Further, the program described above can be a program for partially realizing the functions described above, or a program capable of realizing the functions described above in combination with a program having already been recorded on the computer system.

Although the embodiments of the invention are hereinabove described in detail with reference to the accompanying drawings, the specific configuration is not limited to the embodiments described above, but the design and so on within the scope or the spirit of the invention should also be included therein.

What is claimed is:

1. An image display device comprising:

a light control device configured to determine, based on an image signal, whether or not an image has a first feature or a second feature, the second feature corresponding to a state in which a chroma of the image is lower than a predetermined criterion; and an optical system adapted to display the image signal as a projection image, the optical system including:

a light source adapted to emit light for image display;

a fly-eye lens which the light emitted from the light source enters;

a dimmer adapted to control light intensity of light having passed through the fly-eye lens with an aperture ratio determined based on features of the image; and a modulator adapted to modulate the light with the light intensity controlled by the dimmer, wherein the dimmer controls the light intensity of the light in a case in which the image has the first feature, using a first aperture ratio corresponding to a case in which the image fails to have the second feature, and a second aperture ratio higher than the first aperture ratio and corresponding to a case in which the image has the second feature.

2. The image display device according to claim 1, wherein the dimmer controls the light intensity of the light so that a number of lens cells of the fly-eye lens, which transmit lights included in the light with the light intensity controlled by the dimmer, decreases when the aperture ratio decreases, and the dimmer controls the light intensity of the light so that the number of the lens cells of the fly-eye lens, which transmit the lights included in the light with the light intensity controlled by the dimmer, increases in response to change in the aperture ratio of the dimmer to the second aperture ratio in the case in which the image has the second feature.

3. The image display device according to claim 1, wherein an image feature quantity of the image signal related to the first feature of the image is at least either one of a white peak value, which is a maximum value of luminance values of respective pixels in a frame, and an average value of luminance in the frame.

4. The image display device according to claim 3, wherein a variation in the aperture ratio with respect to a variation in the image feature quantity of the image signal with respect to the first feature of the image is smaller in the case in which the image has the second feature than in the case in which the image fails to have the second feature.

5. The image display device according to claim 1, wherein a state in which the image has the second feature corresponds to a state in which the image has uniformity of a luminance distribution in a screen higher than a predetermined criterion.

6. The image display device according to claim 1, wherein the aperture ratio corresponding to the case in which the image has the second feature is set to be one of equal to and higher than a predetermined value regardless of whether or not the image has the first feature.

7. The image display device according to claim 1, wherein the light control device is further configured to determine that the image has the second feature in a case in which the image is a monochrome image.

8. The light control device according to claim 1, wherein the light control device is further configured to determine that the image has the second feature in a case in which the image is a raster image with a same luminance uniformly distributed on a screen.

* * * * *